Patented Feb. 19, 1929.

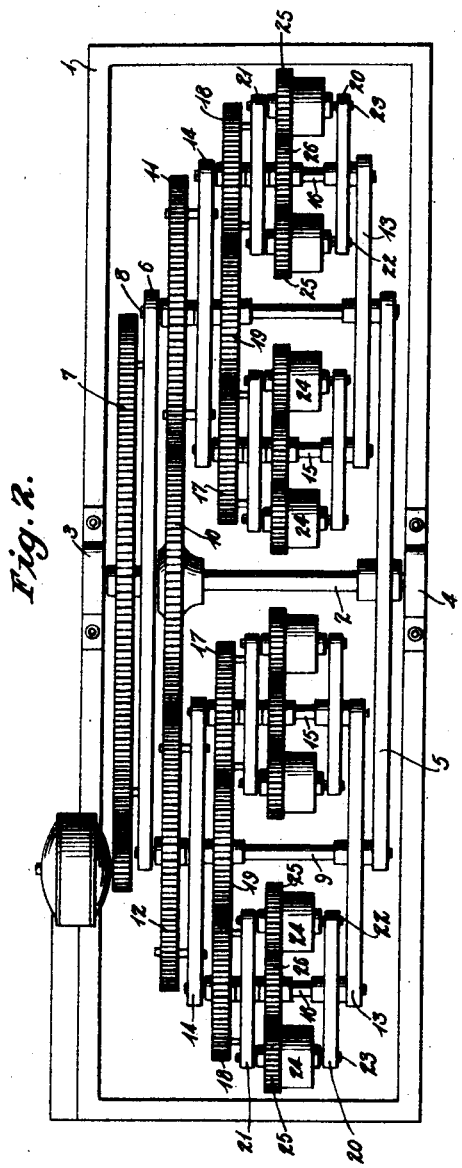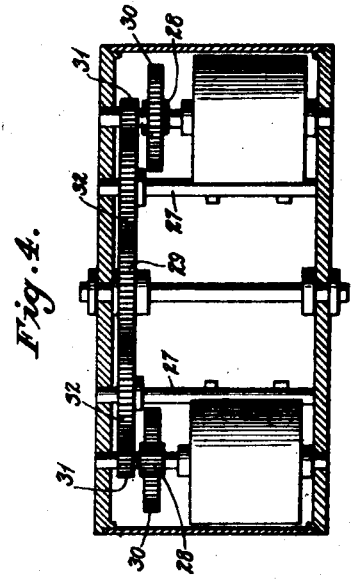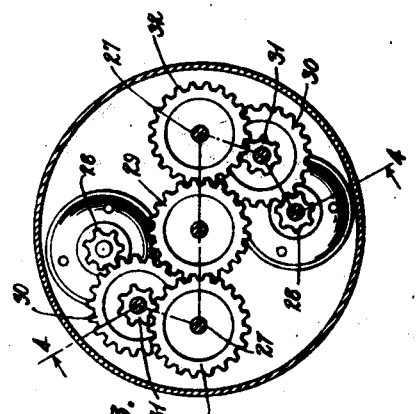

1,703,016

UNITED STATES PATENT OFFICE.

ANTONIO ROSSI, OF BELLEVILLE, NEW JERSEY.

TRANSMISSION MULTIPLICATION MECHANISM.

Application filed September 15, 1928. Serial No. 306,202.

The present invention relates to a gearing mechanism for the transmission of power and is concerned more particularly with a complex system of planetary gearing which is adaptable to a variety of purposes but which has been designed primarily for operating large power plant electricity generators.

It is an object of my invention to provide a transmission mechanism of the character indicated which shall be quite durable and relatively efficient.

More particularly, it is an object of my invention to provide a transmission mechanism of the planetary type wherein a plurality of independent prime movers may be employed in such a manner as to combine their efforts and apply the combined effort to the particular work for which the mechanism may be employed.

Further objects and advantages of my invention will appear in connection with the following description together with the accompanying drawings.

In the drawings,

Fig. 2 is a top plan view of the device shown in Figure 1 but illustrating a different relation of the parts, Fig. 3 is a view in end elevation illustrating a modified form of my invention, Fig. 4 is a sectional view on line 4—4 of Figure 3.

Figure 1:
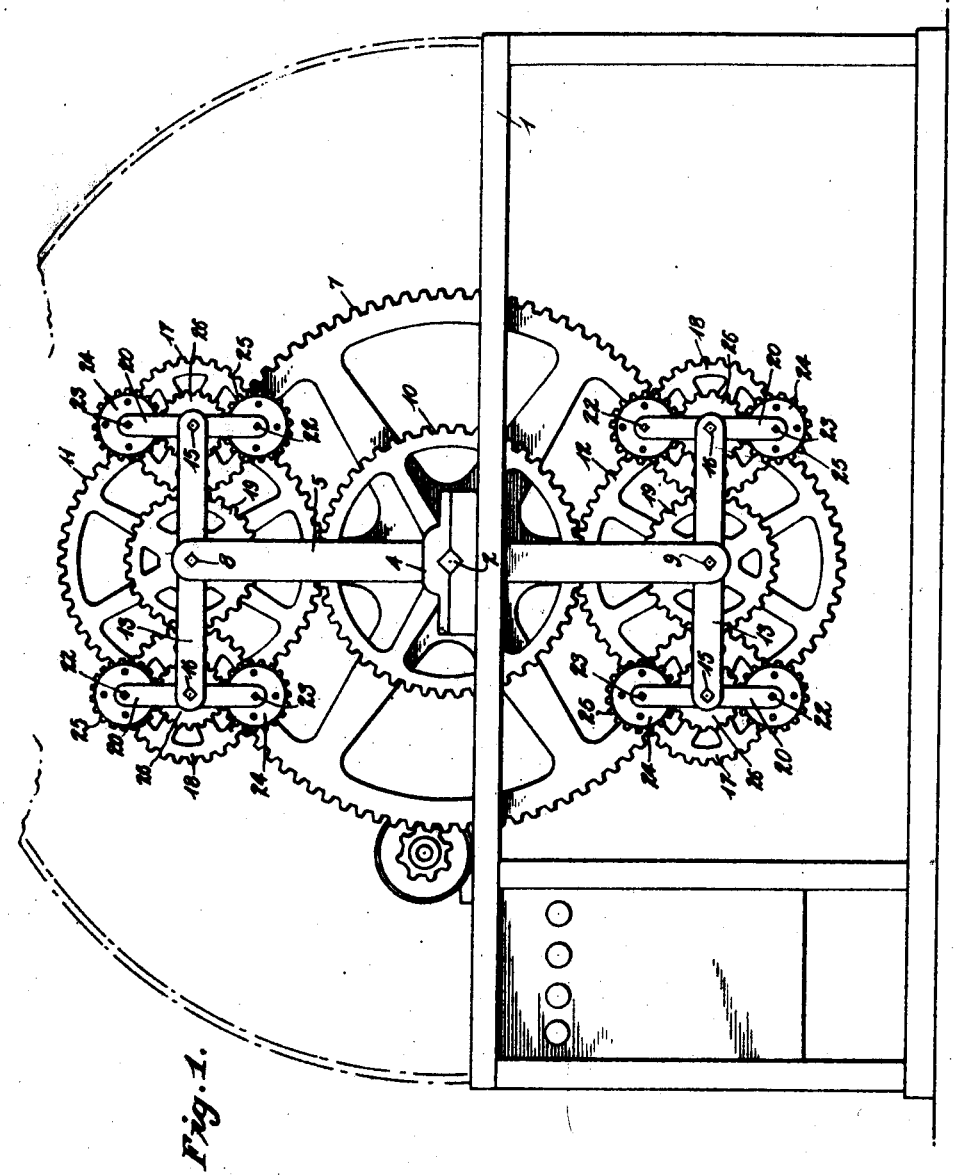
Fig. 1 is a view of my improved transmission in end elevation.

Referring to Figures 1 and 2 of the drawings, the reference numeral 1 designates a suitably mounted frame which forms a support for my transmission mechanism. The frame is of open rectangular form and is preferably mounted in a substantially horizontal position. A shaft 2 extends transversely of the frame substantially midway of the length thereof and is non-rotatably mounted upon the side frame members as indicated at 3 and 4. This shaft 2 and the frame 1 are relatively fixed and my improved system of planetary gearing is revolubly supported by the shaft for movement within the confines of the frame.

Journaled upon shaft 2 in spaced relation are a pair of arms 5 and 6, the latter of which is secured for rotation in unison with a large gear 7, which is also journaled on shaft 2, by means of suitable connecting members indicated at 8. The adjacent or corresponding ends of arms 5 and 6 are connected by transversely extending shafts 8 and 9 whereby the arms are caused to rotate in unison. The ends of shafts 8 and 9 are of irregular contour and are secured in correspondingly formed apertures in the ends of the arms, whereby the shafts are held in non-rotatable relation with reference to the arms. Secured to shaft 2 adjacent the arm 6 is a central or sun gear 10 and in meshing engagement therewith is a pair of planet gears 11 and 12 which are rotatably mounted on shafts 8 and 9 respectively. Thus, arms 5 and 6 and connecting shafts 8 and 9 are adapted to revolve about the fixed shaft 2 with planet gears 11 and 12 in running mesh with the stationary sun gear 10. This mechanism may therefore be termed a planetary gearing unit, which for convenience may be regarded as the primary unit of the system. The means by which this primary unit is driven will now be described.

Each planet pinion of the primary unit is adapted to be driven by a secondary planetary unit. The secondary units are identical and each comprises a pair of spaced arms 13 and 14 rotatably mounted upon shafts 8 and 9, one of the said arms 14 being rotatably coupled to each of the planet gears 11 and 12 of the primary unit. Corresponding ends of arms 13 and 14 are connected by shafts 15 and 16 which are non-rotatably secured in said arms in the manner described in connection with the shafts of the primary unit. Planet gears 17 and 18 are rotatably supported on shafts 15 and 16 and these gears are adapted to mesh with fixed sun gears 19 secured to the non-rotatable shafts 8 and 9. Thus, the arms 13 and 14, shafts 15 and 16, planet gears 17 and 18 and sun gear 19 constitute secondary planetary units, the carrier elements of which serve to drive the planet pinions of the primary unit.

The planet gears of the secondary units are in turn actuated by tertiary units wherein the power for the entire system originates. There are four of these tertiary units, one associated with each of the four planet gears of the secondary units. Each tertiary unit comprises a pair of spaced arms 20 and 21 journaled upon the planet shafts of the secondary units and having the arms 21 rotatively secured to the corresponding planet gears of said secondary units. The adjacent ends of arms 20 and 21 are likewise provided with shafts 22 and 23 non-rotatively associated therewith. Each of these fixed shafts has secured thereto the armature of an electric motor, the fields 24 whereof are rotatable about the fixed shafts and armatures. The rotatable field of each motor is provided with a planet pinion 25 which engages with a non-rotatable sun gear 26 secured to the corresponding planet gear shaft of the secondary units.

The operation of this novel transmission system will now be described. Energization of the several electric motors causes the several field elements and associated gears to rotate and by reason of the engagement of the gears of each tertiary unit with relatively fixed sun gears, the motors and connected gears together with the carrier frame by which they are supported, are caused to revolve about the axes of the said sun gears. Thus, it is apparent that the motive power of the system originates in the several tertiary units. In the particular construction shown there are four tertiary units, two secondary units and a single primary unit. The tertiary units are associated in pairs with the two secondary units, the carrier frames of said tertiary units being drivingly connected with the planet gears of the secondary units. The carrier frames of the secondary units are in turn drivingly connected with the planet gears of the primary unit. The movement of the carrier frame of the primary unit may be utilized in any desired manner and by way of example the frame is herein illustrated as being directly secured to a gear which drives a generator.

It will be appreciated that the several driving motors may be supplied with current in any desired manner and I have therefore deemed it unnecessary to illustrate any particular circular arrangement. In accordance with my invention, it is contemplated that in the use of my device the driving motors may be energized simultaneously or successively as desired.

It should be appreciated that my invention is not limited to the employment of any particular set of gear ratios, this being a matter of choice to be governed by the work to be performed. Obviously, the acompanying drawings are not intended to depict any particular gear ratio. Either a reduction or step-up in speed may be accomplished by the selection of appropriate gear ratios.

In Figures 3 and 4 I have illustrated a slightly modified form of planetary unit which may be employed in lieu of the tertiary units of Figures 1 and 2. In this form the motor shafts are rotatably supported in the carrier frame while the field structures are secured against rotation by means of cross bars 27 and suitable securing means passing therethrough and into engagement with the motor casings. Each motor shaft carries a pinion 28 and for each unit there is a relatively fixed sun gear 29. Interposed between the pinions 28 and sun gear 29 is a train of reduction gearing comprising gears 30, 31 and 32. In the arrangement shown, these gears effect a substantial reduction in speed but it should be appreciated that any desired speed change may be produced by proper gear ratios.

What I claim is:

1. In a transmission system, the combination with a primary planetary unit consisting of a relatively fixed sun gear, cooperating planet gears and a carrier whereon said planet gears are mounted, of a secondary unit of substantially similar character revolubly supported by the carrier of the said primary unit and drivingly connected with the aforesaid planet gears of the primary unit and a tertiary unit revolubly supported by the carrier of the said secondary unit and having driving connection with the planet gears of said secondary unit and a prime mover associated with one of the elements of said tertiary unit.

2. In a transmission system, a non-rotatable shaft, a sun gear fixed thereon, a planet carrier revolubly supported on said shaft, a planet shaft non-rotatably secured in said carrier, a planet gear rotatably mounted on said planet shaft and having meshing engagement with said fixed sun gear and means for driving said planet gear comprising another planetary unit of like character, the carrier whereof is revolubly supported on the aforesaid planet shaft and has driving connection with the aforesaid planet gear, a sun gear fixed to the aforesaid planet shaft, a planet gear rotatably supported by the carrier of the last mentioned unit and meshing with the last mentioned sun gear and a motor mounted on the carrier and drivingly connected with the last mentioned planet gear.

3. A planetary gear system comprising primary, secondary and tertiary planetary units, each of said units comprising a relatively fixed sun gear, a planet carrier, planet shafts non-rotatably secured in said carrier and planet gears rotatably supported on said shafts, the carriers of said secondary and tertiary units being revolubly mounted on the planet shafts of said primary and secondary units respectively and the sun gears of said secondary and tertiary units being secured to the planet shafts of said primary and secondary units respectively, the carrier of said secondary and tertiary units being drivingly connected with the planet gears of said primary and secondary units respectively and prime movers supported by the carriers of said tertiary units and drivingly connected with the planet gears thereof.

In testimony whereof I have affixed my signature this 10th day of August, 1928.

ANTONIO ROSSI.